United States Patent Office 3,333,154
Patented July 25, 1967

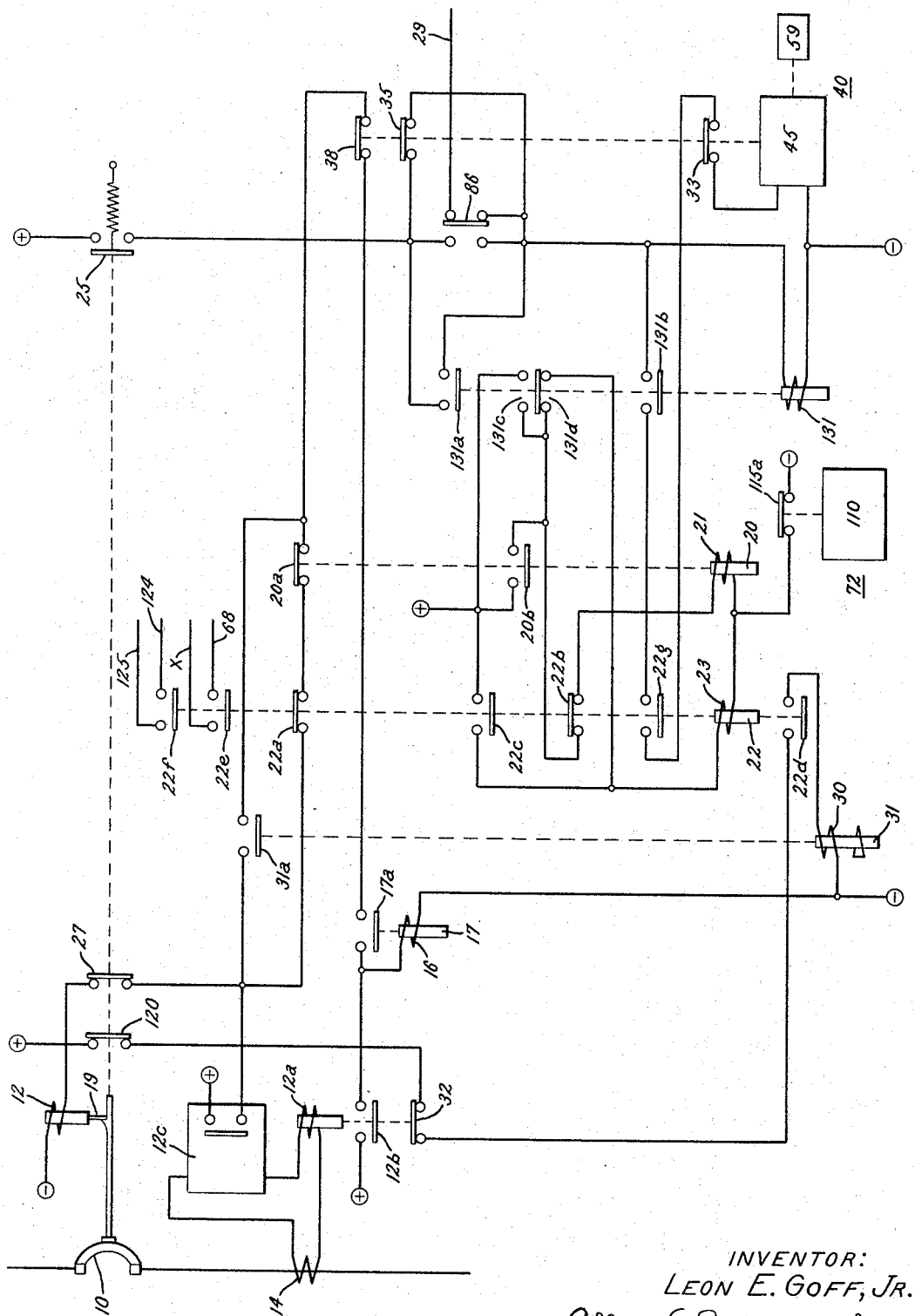

3,333,154
CIRCUIT INTERRUPTER CONTROL MEANS
Leon E. Goff, Jr., Havertown, Pa., assignor to General Electric Company, a corporation of New York
Filed Mar. 31, 1965, Ser. No. 444,249
4 Claims. (Cl. 317—23)

This invention relates to circuit interrupter control means, and more particularly it relates to unique means for obtaining improved operation of an automatic reclosing control system for an electric circuit interrupter.

In the art of electric power transmission and distribution, automatic circuit interrupter reclosing is widely used as a means of obtaining maximum service continuity. Toward this end, control scheme and devices have heretofore been proposed for accomplishing in sequence the following events:

(1) "Instantaneous" opening of a circuit interrupter in response to the occurrence of an overcurrent condition in the electric power circuits being supplied therethrough, whereby the faulted circuit is temporarily deenergized before any sectionalizing fuse can blow, (2) High-speed reclosing of the interrupter, whereby normal service is quickly restored to all connected circuits if the fault were only transient, (3) Blocking of subsequent instantaneous opening of the interrupter, so that should the fault be "permanent" it can be cleared by time-delay overcurrent protective means such as sectionalizing fuses, and, if necessary, (4) Delayed opening of the interrupter by overcurrent responsive means selectively coordinated with the other time-delay protective means. To ensure proper coordination in such prior art systems, instantaneous tripping of the reclosed interrupter is blocked for a definite period of time long enough to permit preferential clearing of a permanent fault by operation of the aforesaid time delay means. It is desirable in many applications to minimize the length of this blocking period in order to reinstate instantaneous protection as soon as possible against the contingency of an early recurrence, following a first transient fault, of a new or derivative fault.

Accordingly, the general objective of my invention is the provision of improved control means for shortening the period of time that the instantaneous protective means needs to be removed from service following reclosure of a circuit interrupter that was initially opened in response to a transient fault.

My invention in one form has utility in connection with a circuit interrupter that is automatically reclosed immediately after being tripped by operation of "instantaneous" fault responsive protective means, with blocking means being used for preventing subsequent opening of the interrupter by the instantaneous protective means until reset. According to the present invention, conditionally operative blocking-cancellation means is provided for resetting the aforesaid blocking means and thereby restoring the protection afforded by the instantaneous protective means on the expiration of a very short period of time (e.g. 0.1 second) following the initial reclosure of the interrupter. I also provide fault-checking means for preventing operation of the blocking-cancellation means in the event that, on reclosure, current through the interrupter attains a predetermined magnitude before the expiration of said short period of time, whereby the blocking-cancellation means is able to operate only on condition that no fault current is detected in the protected circuit during this momentary blocking. Consequently, if the original fault were "permanent" (i.e., if it persists when the interrupter initially recloses), the fault-checking means will prevent cancellation of the blocking of the instantaneous protective means, and this fault will ultimately be cleared in response to operation of other protective means (e.g. sectionalizing fuses) with proper time coordination. On the other hand, if the original fault were "transient" (i.e., if it is cleared by the time the interrupter recloses), the blocking of the instantaneous protective means is quickly discontinued and any subsequent fault will cause a second instantaneous tripping of the interrupter in the normal course.

My invention will be better understood and its various objects and advantages will be more fully appreciated from the following description taken in conjunction with the accompanying drawing the single figure of which is a schematic circuit diagram of circuit interrupter control means comprising one embodiment of the invention.

Referring now to the drawing, a circuit interrupter is illustrated schematically at 10 for protecting an electric current circuit. This circuit interrupter, which may be of any conventional type, is shown in a latched closed position in which it normally will remain until a latch 19 is tripped by energization of a trip coil 12, whereupon a high-speed circuit opening operation automatically will take place. Although not shown in the drawing, the interrupter 10 is also provided with automatic closing means of appropriate design for operating the interrupter from its open position to the latched closed position in response to energization of a conventional electroresponsive reclosing control relay or device.

The trip coil 12 of the circuit interrupter 10 is energized under control of an instantaneous tripping relay 12a and a time delay tripping relay 12c when a fault (short circuit) or overload occurs in the protected circuit, as reflected by current of abnormally high magnitude in the secondary winding of a current transformer 14 that is coupled to the circuit as shown. These relays can be of any suitable electromechanical or "static" design. While the relays 12a and 12c have been shown separately, they could if desired be combined in a single overcurrent responsive device that is capable of selectively performing both their functions.

Rapid circuit opening operation of the interrupter 10 is initiated when the instantaneous tripping relay 12a first picks up in response to an overcurrent condition of predetermined severity in the protected circuit. A normally open contact 12b of the relay 12a will then close to connect the operating winding 16 of an auxiliary tripping relay 17 for energization to a source of D-C supply power indicated in the drawing by the encircled positive and negative symbols (+ and −). As a result the auxiliary relay 17, which may be designed to pick up with a slight time delay of approximately .067 second if desired, closes a normally open contact 17a connected with contact 12b in an energizing circuit for the trip coil 12 of the circuit interrupter 10. This energizing circuit extends from the positive supply voltage terminal, through the contacts 12b and 17a in series, through a normally closed contact 38 of a 2-position multiple contact latching switch unit 40 (about which more will be said later), through normally closed contacts 20a and 22a of blocking relays 20 and 22, respectively, through a circuit interrupter auxiliary switch contact 27 that is closed only so long as the interrupter 10 is closed, and through the trip coil 12 to the negative supply voltage terminal. Thus a rapid circuit opening operation of the circuit interrupter 10 is initiated.

As soon as the circuit interrupter 10 opens in response to the above-described operation, it is automatically reclosed. Reclosure is initiated by energizing a reclosing control relay (not shown) that is connected to the positive supply voltage terminal by way of a conductor 29, a preset reclosure control switch 86, a preset contact 35 of the latching switch unit 40, and an auxiliary switch contact 25 that closes upon opening of the interrupter 10. At the same time the operating winding of an anti-pump control relay 131 is energized, and its normally open contact 131a closes across contact 35.

Concurrently, another normally open contact 131c of the anti-pump relay 131 is closed to complete an energizing circuit for an operating winding 21 of the blocking relay 20. As is shown in the drawing, this circuit extends between positive and negative supply voltage terminals through contacts 131c, a normally closed contact 22b of the companion blocking relay 22, the winding 21, and a normally closed contact 115a associated with resetting means 110 of a reclosing cycle timer 72 (about which more will be said later). When thus energized the blocking relay 20 picks up, and its normally open contact 20b closes across contact 131c. Now the normally closed contact 20a of this relay is open in the previously described energizing circuit for the circuit interrupter trip coil 12, and initiation of another rapid opening operation of the interrupter 10 by the instantaneous tripping relay 12a is blocked.

As the circuit interrupter 10 closes in response to the above-described automatic reclosing operation, the auxiliary switch contact 25 opens to deenergize the antipump relay 131. The resulting closure of this relay's normally closed contacts 131d will complete an energizing circuit for an operating winding 23 of the second blocking relay 22. This circuit extends from the positive supply voltage terminal through the now closed contact 20b of blocking relay 20, the contacts 131d, the winding 23, and the contact 115a to the negative supply voltage terminal. When thus energized, the blocking relay 22 picks up, and its normally open seal-in contact 22c closes across the series combination of contacts 20b and 131d to maintain the relay picked up so long as the contact 115a remains closed. The concurrent opening of contact 22b allows relay 20 to drop out, while the opening of contact 22a in the energizing circuit of trip coil 12 effects continued blocking of subsequent opening of the interrupter 10 by the instantaneous tripping relay 12a.

With the circuit interrupter 10 reclosed and the blocking relay 22 picked up, a circuit is set up through an auxiliary switch contact 120 of the interrupter and a normally open contact 22d of the blocking relay for energizing an operating winding 30 of a disabling means 31. As is shown on the drawing, the disabling means 31 comprises a time delay relay having a normally open contact 31a connected in parallel relation to the series combination of contacts 20a and 22a in the instantaneous energizing circuit for trip coil 12. Closure of the contact 31a will cancel the previously described blocking effect of the blocking relays 20 and 22, that is, it will again permit the instantaneous tripping relay 12a to successfully initiate an opening operation of the circuit interrupter 10 even though the relays 20 and 22 have operated.

The relay 31 is operative to close contact 31a on the expiration of a predetermined short period of time (e.g. 0.1 second) following energization of its winding 30. The winding 30 is connected between positive and negative supply voltage terminals in series with the circuit interrupter auxiliary contact 120, the blocking relay contact 22d, and a normally closed fault-checking contact 32 of the instantaneous tripping relay 12a. Thus the winding 30 is energized when all three of these contacts are closed, and the relay 31 picks up and closes its contact 31a when this condition has continued to exist for the full delay period. If at any time before relay 31 picks up its energizing circuit were interupted by opening of the fault-checking contact 32 due to current in the protected circuit when attaining the predetermined magnitude required to pick up the instantaneous tripping relay 12a, the relay 31 will not operate. In this event the contact 31a remains open, and cancellation of the aforesaid blocking effect of the relays 20 and 22 is prevented. The relay 31 is therefore operative only if there is no overcurrent condition subsisting in the protective circuit during the short period of time it takes this relay to operate when energized.

For the purpose of controlling succeeding reclosures of the circuit interrupter 10, the blocking relay 22 has been provided with a pair of normally open contacts 22e and 22f that close when this relay picks up. The contact 22e, which is shown connected between a line X and a conductor 68, is used to start the timing operation of the reclosing cycle timer 72. This timer may be of any suitable design and construction commonly used in automatic reclosing control systems, such as, for example, the timer identified by the same reference character in my earlier Patent 2,582,027 granted on Jan. 8, 1952, and assigned to the assignee of the present application. That particular timer comprises a driving motor resetably connected through a releasable clutch to a cam shaft that will operate, at predetermined check intervals in a preset cycle, a reset control switch as well as the timing reclosure control switch 86. The shaft, along with the operating cams connected thereto, is spring returned to its initial position to restart the cycle whenever the clutch is disengaged in response to energization of releasing means 110, at which time the contact 115a will open to allow the blocking relay 22 to return to the normal (deenergized) position thereof. The energizing circuit for the releasing means 110 includes, in series, the aforesaid reset control switch, the blocking relay contact 22f (shown connected between two conductors 124 and 125), and an auxiliary switch contact such as 120 that is closed while the circuit interrupter 10 remains closed. Therefore, when the reset control switch closes at the end of a predetermined check interval (e.g., three seconds) after the driving motor of the reclosing cycle timer 72 is started by closure of the contact 22e, both the timer 72 and the relay 22 will be reset, unless the initial reclosure was unsuccessful and the circuit interrupter 10 is then open due to the prior occurrence in the protected electric current circuit of a persistent or an independent fault condition.

Assume first that the original fault in the protected circuit has persisted. That is, assume that the original fault was "permanent" in that it was not cleared after the initial rapid opening operation of the interrupter 10 and excessive current resumed in the circuit as soon as the interrupter reclosed. The instantaneous energizing circuit for the trip coil 12 is now blocked by the open contact 22a, and the time delay relay 31 is prevented from closing its blocking-cancellation contact 31a by the open contact 32 of the instantaneous tripping relay 12a which picks up immediately in response to the recurrence of the overcurrent condition. The second opening operation of the circuit interrupter 10 will therefore be initiated later by the time delay tripping relay 12c whose normally open contact is connected in series with the auxiliary switch contact 27 and the trip coil 12 between positive and negative supply voltage terminals. The delayed operation of relay 12c allows time for preferential clearing of the permanent fault by sectionalizing protective devices such as fuses (not shown).

As soon as the circuit interrupter 10 reopens in response to the delayed operation of relay 12c, it is automatically reclosed again. The second high speed reclosure is initiated by energizing the conductor 29 through the preset reclosure control switch 86, the preset contact 35 of the latching switch unit 40, and the circuit interrupter auxiliary switch contact 25. Simultaneously the anti-pump relay 131 picks up and its normally open contact 131b is closed to complete an energizing circuit for a trip winding 45 of the latching switch unit 40. As is shown in the drawing, this energizing circuit extends between positive and negative supply voltage terminals through contacts 25, 131a and 131b, through a normally open contact 221 of the blocking relay 22 which at this time is picked up and sealed in, and through a normally closed contact 33 of the unit 40. The switch unit 40 may be of any suitable design and construction commonly used in automatic reclosing control systems, such as, for example, the two-position multiple contact unit identified by the same reference character in my earlier patent, 2,582,027. The contacts of that particular unit are biased to their normal positions by a spring and are mechanically connected to be operated as a unit with an interlocking element against this bias upon energization of the trip winding 45, whereupon a releasable latch operates on the interlocking element so as to hold the contacts open until released by energization of a reset winding 59 if reclosure of the circuit interrupter proves successful. The reset winding 59 may be arranged for energization in response to the above-described resetting of the reclosing cycle timer 72.

When the unit 40 operates, contact 38 opens in the instantaneous energizing circuit for the trip coil 12, whereby the instantaneous tripping relay 12a is rendered ineffective to initiate opening of the circuit interrupter 10 until a reset operation is subsequently obtained by energization of the reset winding 59. Contact 35 also opens, and the timing recloser control switch 86 operates as described in detail in Patent 2,582,027 to produce one or more additional time-delayed reclosures in case the circuit interrupter 10 fails to remain closed for the limited check interval after the second or succeeding reclosures.

Next let it be assumed that the original fault in the protected circuit was only temporary or transient and that it disappeared by the time the initial high-speed reclosure of the circuit interrupter 10 was effected. In this case the fault-checking contact 32 will remain closed, and the operating winding 30 of the time delay relay 31 is energized upon reclosure of the interrupter. Consequently the instantaneous energizing circuit for the trip coil 12 is blocked only briefly, during the short period of time that the relay 31 requires to operate. The resulting closure of contact 31a cancels the blocking effect of the open contact 22a and resets the instantaneous energizing circuit.

If now a second, independent fault should occur in the protected circuit while the relay 31 is picked up, another rapid circuit opening operation of the interrupter 10 will be initiated. The instantaneous trip relay 12a picks up, thereby closing contact 12b and opening contact 32. The auxiliary tripping relay 17 responds by closing its contacts 17a to complete the instantaneous energizing circuit (comprising the contacts 12a, 17a, 38, 31a, and 27) for the trip coil 12 before the time delay relay 31 has time to drop out, even though the operating winding 30 of the latter relay becomes deenergized when contact 32 opens. As soon as the circuit interrupter 10 reopens, it is automatically reclosed again in the manner of the second high-speed reclosure described hereinbefore.

While I have shown and described a particular embodiment of my invention by way of illustration, many modifications will occur to those skilled in the art. I therefore contemplate by the concluding claims to cover all such modifications as fall within the true spirit and scope of the invention.

What I claim as new and desire to secure by Letters Patent of the United States is:

1. In control means for a circuit interrupter that is adapted to protect an electric current circuit:
    (a) first means for initiating a rapid circuit opening operation of the interrupter when an overcurrent condition occurs in the protected circuit;
    (b) second means responsive to opening of the interrupter for initiating a circuit reclosing operation thereof;
    (c) third means effective in response to opening of the interrupter for blocking subsequent initiation of a rapid opening operation of the interrupter by said first means;
    (d) fourth means operative to cancel said blocking effect on the expiration of a predetermined short period of time following reclosure of the interrupter; and
    (e) fifth means for preventing said fourth means from cancelling said blocking effect in the event that, on reclosure of the interrupter, current in the protected circuit should attain a predetermined magnitude at any time before said fourth means operates, whereby said fourth means is operative only if there is no overcurrent condition subsisting in the protected circuit during said predetermined period.

2. The control means of claim 1 in which the length of said predetermined short period of time is approximately 0.1 second.

3. The control means of claim 2 in which the first means takes no more than approximately 0.08 second to initiate rapid opening of the interrupter when an overcurrent condition occurs.

4. The control means of claim 1 in which sixth means is provided for initiating a circuit opening operation of the interrupter in delayed response to an overcurrent condition in the protected circuit during said predetermined period of time.

References Cited

UNITED STATES PATENTS

| 2,687,497 | 8/1954 | Schurr | 317—23 |
| 3,109,961 | 11/1963 | Casey et al. | 317—23 X |
| 3,114,079 | 12/1963 | Sofianek et al. | 317—22 |
| 3,178,615 | 4/1965 | Miller et al. | 317—22 |

OTHER REFERENCES

"A New Electronic Timing Relay for Reducing Outages of Power Circuits"; F. S. Dlovhy, AIEE Trans., vol. 65, 1946, pp. 407–11.

MILTON O. HIRSHFIELD, *Primary Examiner.*

R. V. LUPO, *Assistant Examiner.*